United States Patent
Ahn et al.

(10) Patent No.: US 11,827,269 B2
(45) Date of Patent: Nov. 28, 2023

(54) STEERING APPARATUS

(71) Applicant: HYUNDAI MOBIS CO., LTD., Seoul (KR)

(72) Inventors: Sung Joon Ahn, Seoul (KR); Seung Hwan Lee, Hwaseong-si (KR); Kyung Hoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/708,421

(22) Filed: Mar. 30, 2022

(65) Prior Publication Data
US 2022/0315093 A1 Oct. 6, 2022

(30) Foreign Application Priority Data

| Mar. 31, 2021 | (KR) | 10-2021-0041653 |
| Mar. 31, 2021 | (KR) | 10-2021-0041654 |
| Jun. 3, 2021 | (KR) | 10-2021-0072449 |
| Jun. 3, 2021 | (KR) | 10-2021-0072450 |

(51) Int. Cl.
*B62D 1/22* (2006.01)
*B62D 1/185* (2006.01)
*B62D 1/187* (2006.01)

(52) U.S. Cl.
CPC ............. *B62D 1/22* (2013.01); *B62D 1/185* (2013.01); *B62D 1/187* (2013.01)

(58) Field of Classification Search
CPC .......... B62D 1/22; B62D 1/185; B62D 1/187; B62D 1/18; B60K 2370/733; B60K 2370/744; B60K 2370/782; B60K 37/06
See application file for complete search history.

(56) References Cited

U.S. PATENT DOCUMENTS

| 10,562,558 | B1* | 2/2020 | Spahn ............... B62D 1/10 |
| 10,742,967 | B2* | 8/2020 | Hoggarth ............ B60K 35/00 |
| 11,292,504 | B2* | 4/2022 | Palm ................ B62D 1/22 |
| 11,345,388 | B2* | 5/2022 | Murayama ........... B62D 1/181 |
| 2004/0016588 | A1* | 1/2004 | Vitale ............... B62D 1/18 180/322 |
| 2005/0283288 | A1* | 12/2005 | Howell .............. B62D 1/18 701/41 |
| 2016/0347348 | A1* | 12/2016 | Lubischer .......... G05D 1/0088 |
| 2018/0052541 | A1* | 2/2018 | Hoggarth ........... G06F 3/0488 |
| 2021/0380158 | A1* | 12/2021 | Kurokawa ........... B62D 1/187 |
| 2022/0238059 | A1* | 7/2022 | Kobata ............ G02B 27/0101 |
| 2022/0371648 | A1* | 11/2022 | Ahn .................. B60K 23/00 |

FOREIGN PATENT DOCUMENTS

DE 102012010125 A1 * 12/2012 ............ B60K 35/00

* cited by examiner

*Primary Examiner* — Drew J Brown
(74) *Attorney, Agent, or Firm* — NovoTechIP International PLLC

(57) ABSTRACT

Provided is a steering apparatus. The steering apparatus includes a console unit allowed to be switched left and right in front of a driver's seat and a front passenger seat in a vehicle, a handle unit connected to the console unit and configured to steer the vehicle, and a rail unit disposed on a bottom surface of the console unit and configured to provide a path through which a position of the console unit is switched left and right.

20 Claims, 12 Drawing Sheets

123

123

STEERING APPARATUS

CROSS-REFERENCE TO RELATED APPLICATIONS

This application claims priority to and the benefit of Korean Patent Application No. 10-2021-0041653, filed on Mar. 31, 2021, Korean Patent Application No. 10-2021-0041654, filed on Mar. 31, 2021, Korean Patent Application No. 10-2021-0072449, filed on Jun. 3, 2021, Korean Patent Application No. 10-2021-0072450, filed on Jun. 3, 2021, the disclosure of which is incorporated herein by reference in their entirety.

BACKGROUND

1. Technical Field

The present invention relates to a steering apparatus.

2. Discussion of Related Art

Generally, with the development of vehicles, a cockpit structure in a vehicle is gradually being diversified, and various types of cockpit structures are provided according to the purpose of each vehicle.

However, according to the related art, it is difficult to improve driving convenience because a steering wheel, which is adjusted upward or downward according to the physique/position of an occupant (including a driver, a passenger, or a user), has a limit in a fixed cockpit.

In addition, in order to satisfy the needs of vehicle occupants according to the driving environment or the purpose of each situation, various types of convenience structures are required.

SUMMARY

The present invention is directed to solving the above-described problems and providing a steering apparatus capable of allowing a position of a steering wheel to be stably switched between a driver's seat and a front passenger seat.

Objects of the present invention are not limited to the above-described object and other objects that are not described may be clearly understood by those skilled in the art from the following descriptions.

According to an aspect of the present invention, there is provided a steering apparatus including a console unit allowed to be switched left and right in front of a driver's seat and a front passenger seat in a vehicle, a handle unit connected to the console unit and configured to steer the vehicle, and a rail unit disposed on a bottom surface of the console unit and configured to provide a path through which a position of the console unit is switched left and right.

A lower end part of the console unit may be moved left and right in a longitudinal direction of the rail unit.

An upper end part of the console unit may have a structure in which a position of the handle unit is adjustable up and down.

When the position of the console unit is switched on the rail unit by a user's manipulation, rotation control by the handle unit may be restricted in a specific section of the rail unit.

The handle unit may include a base plate allowed to be moved up and down along the upper end part of the console unit, a steering column bent upward toward a rear of the base plate, a steering wheel connected to a rear of the steering column, and a lever configured to protrude from a portion of a lower end of the base plate and adjust the vertical movement of the base plate.

The steering wheel may include a button for each function of a paddle shift type.

The steering wheel may include a central part connected to the rear of the steering column so as to steer the steering column and configured to provide a mounting section for a mobile terminal, and grip parts connected at both ends of the central part and configured to provide user's finger grip sections.

When a separate mounting section is formed for the mobile terminal and the mobile terminal is mounted on the mounting section, the mobile terminal may be paired with the vehicle through a vehicle control related application installed in the mobile terminal.

The rail unit may be divided into first and second flat sections which are positioned in front of the driver's seat and the front passenger seat, respectively, and an engaging or engagement section which connects the first and second flat sections and is curved upward.

The rail unit may include a position sensor provided every predetermined section in a longitudinal direction thereof, and when the console unit enters the engaging section, the position sensor may transmit information on a corresponding position to a control unit connected to the handle unit to allow the control unit to restrict the rotation control by the handle unit in the engaging section.

According to another aspect of the present invention, there is provided a steering apparatus serving as a steering apparatus of a purpose built vehicle (PBV) having a separate storage space instead of a cockpit in front of a driver's seat and a front passenger seat in the vehicle.

The steering apparatus may include a console unit allowed to be switched left and right in the storage space in front of the driver's seat and the front passenger seat in the vehicle, a handle unit connected to the console unit and configured to steer the vehicle, and a rail unit disposed on a bottom surface of the console unit and configured to provide a path through which a position of the console unit is switched left and right. In this case, while the console unit is switched left and right, when the console unit enters a specific section of the rail unit, rotation control by the handle unit may be restricted.

The rotation may be adjusted by the handle unit only when the console unit passes the specific section of the rail unit and then is mounted on the driver's seat or the front passenger seat.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Advantages and features of the present invention and methods of achieving the same will be clearly understood with reference to the accompanying drawings and embodiments described in detail below. However, the present invention is not limited to the embodiments to be disclosed below and may be implemented in various different forms. The following embodiments are merely provided to easily inform those skilled in the art of the objects, configuration, and effects of the present invention. The scope of the present invention is defined by the appended claims. Meanwhile, the terms used herein are provided only to describe the embodiments of the present invention and not for purposes of limitation. In this specification, the singular forms include the plural forms unless the context clearly indicates otherwise. It will be understood that the terms "comprise" and/or "comprising," when used herein, specify some stated components, steps, operations and/or elements but do not preclude the presence or addition of one or more other components, steps, operations and/or elements.

Hereinafter, exemplary embodiments of the present invention will be described in detail with reference to the accompanying drawings.

Figure 1:
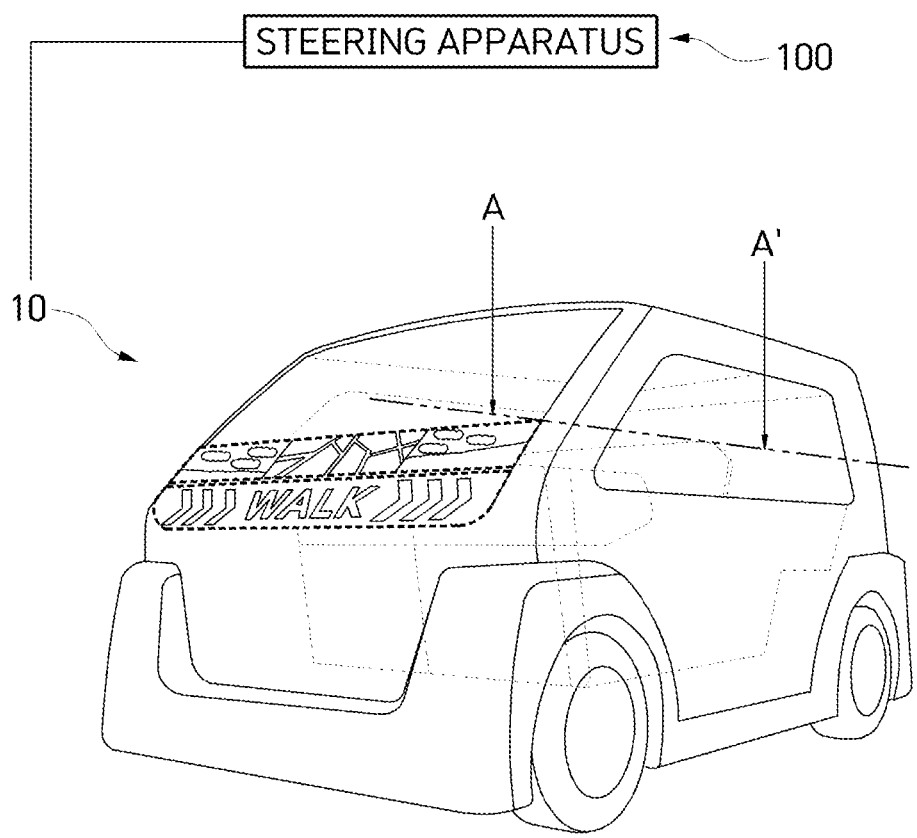
FIG. 1 is a perspective view schematically illustrating a vehicle in which a steering apparatus according to an embodiment of the present invention is installed.
Figure 2:
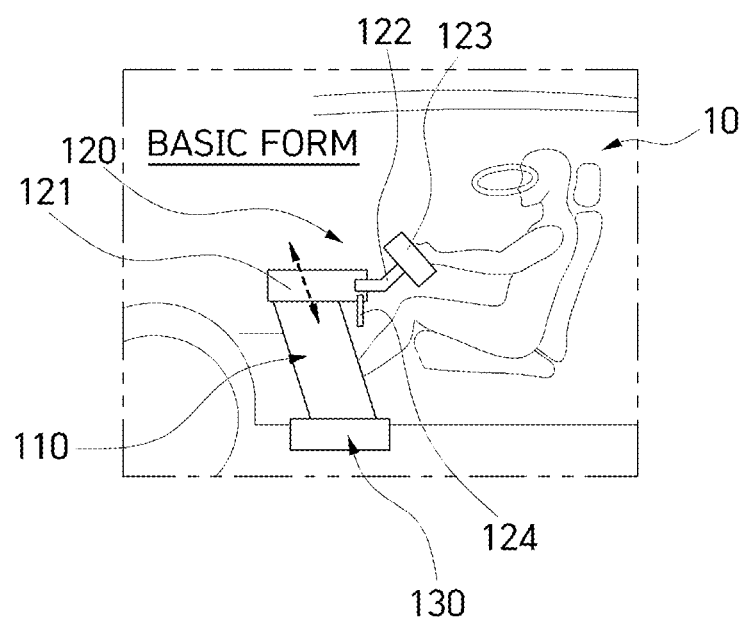
FIGS. 2 to 4 are views illustrating exemplary operations of a steering apparatus according to an embodiment of the present invention on the basis of a cross-sectional structure taken along line A-A' illustrated in FIG. 1.
Figure 3:
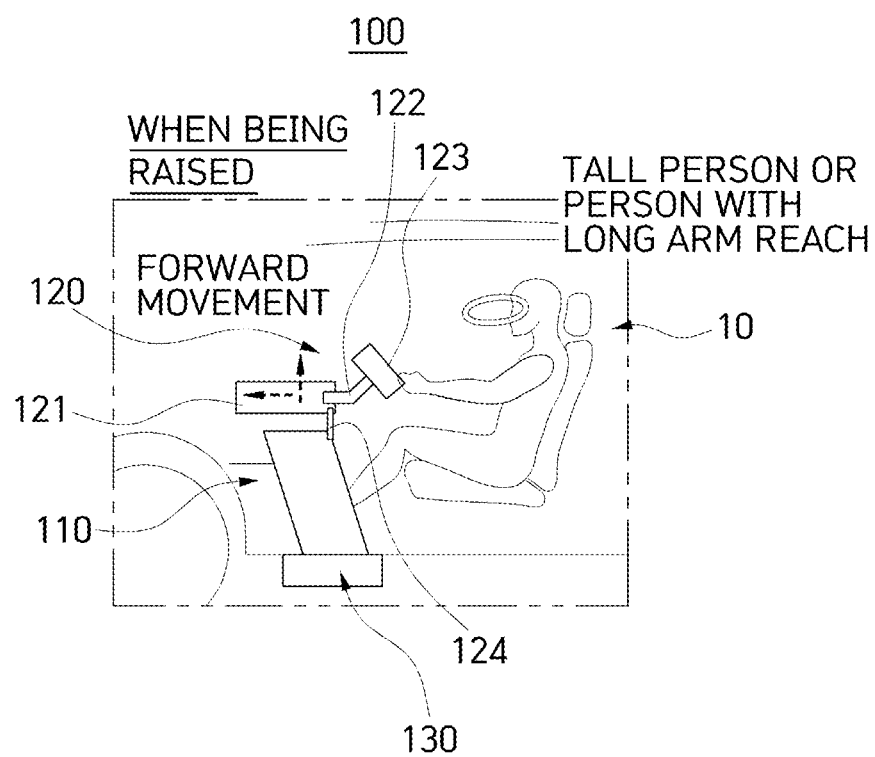
Figure 4:
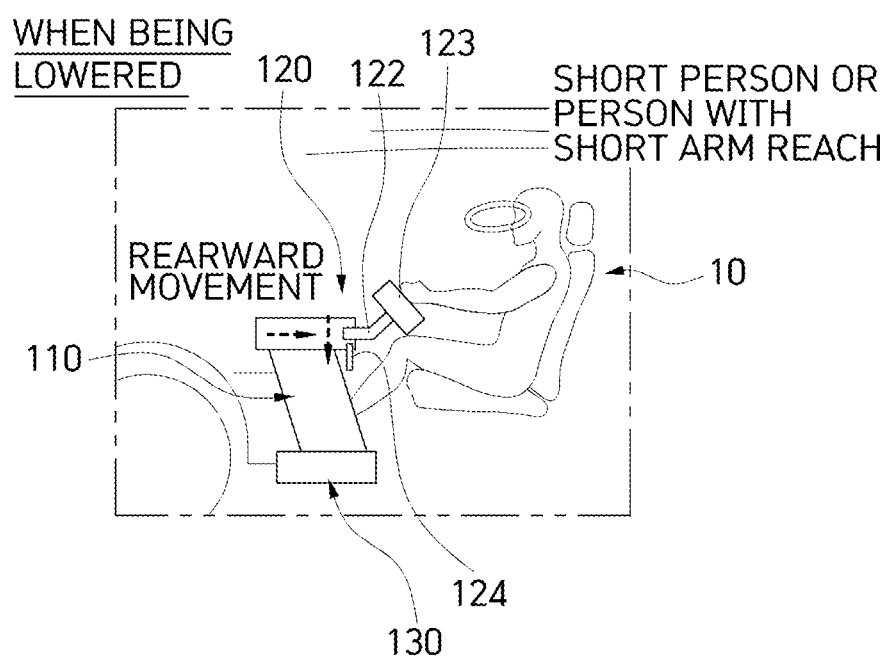
Figure 5:
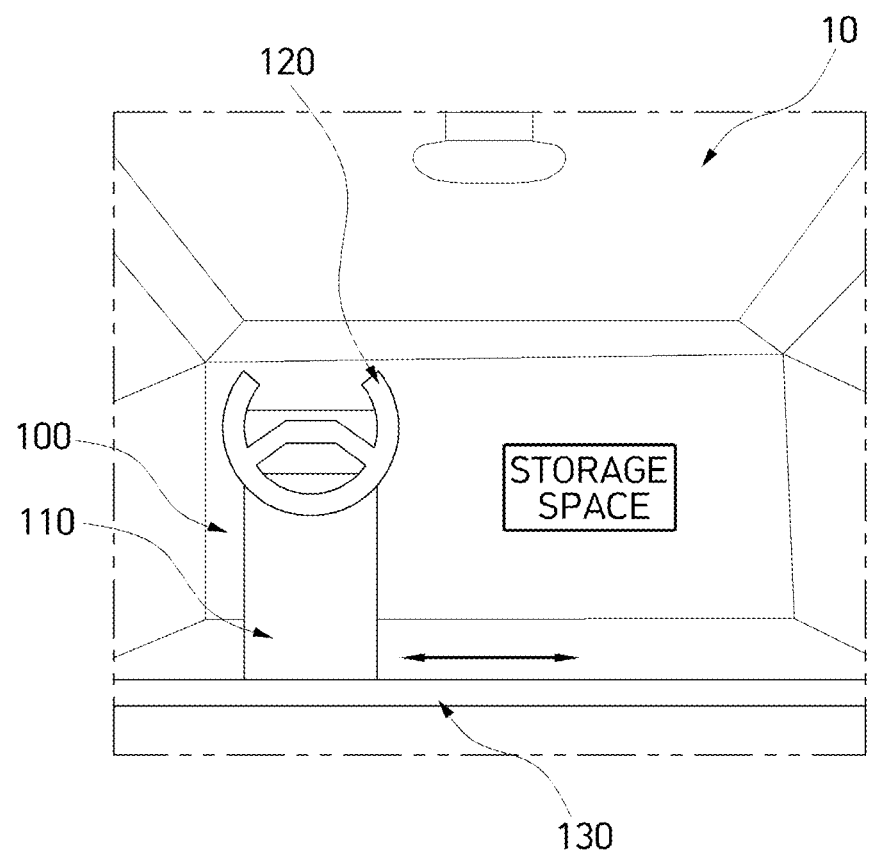
FIGS. 5 to 8 are views illustrating exemplary operations of left and right switching of a handle unit in a steering apparatus according to an embodiment of the present invention.
Figure 6:
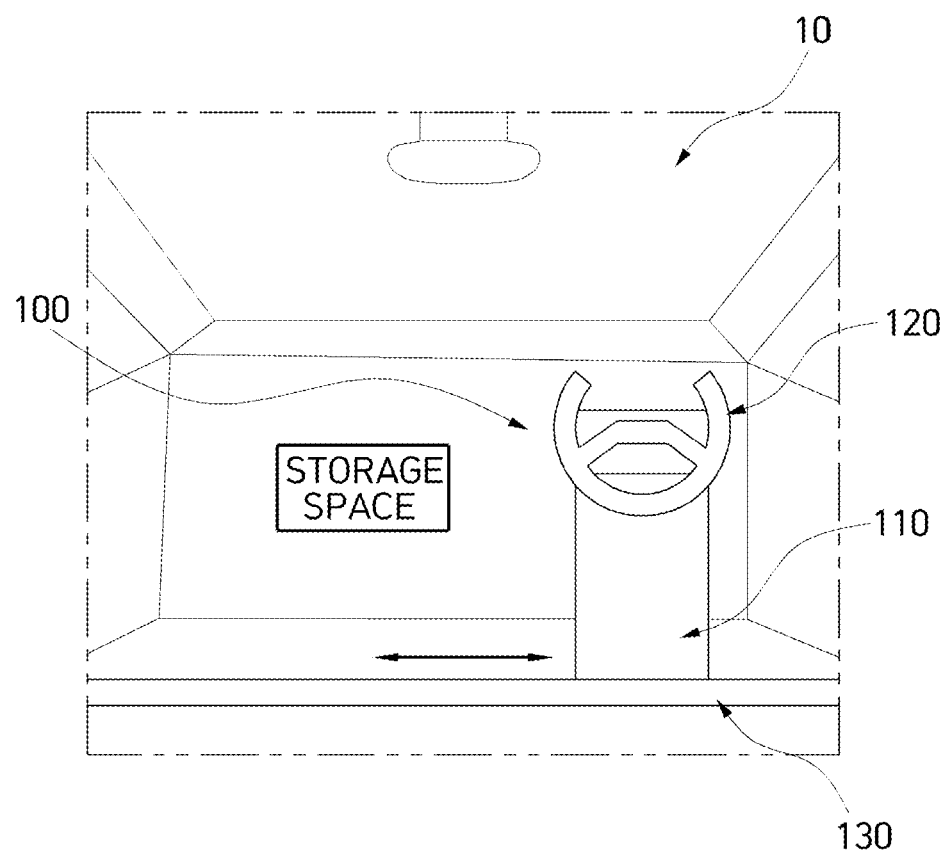
Figure 7:
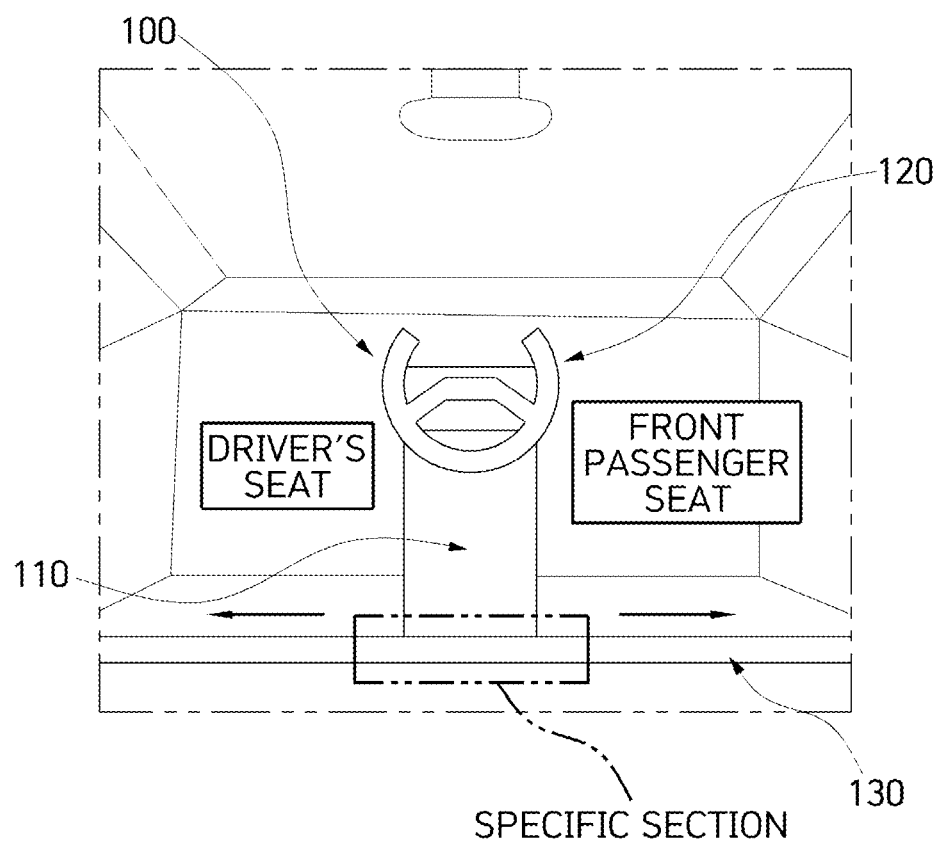
Figure 8:
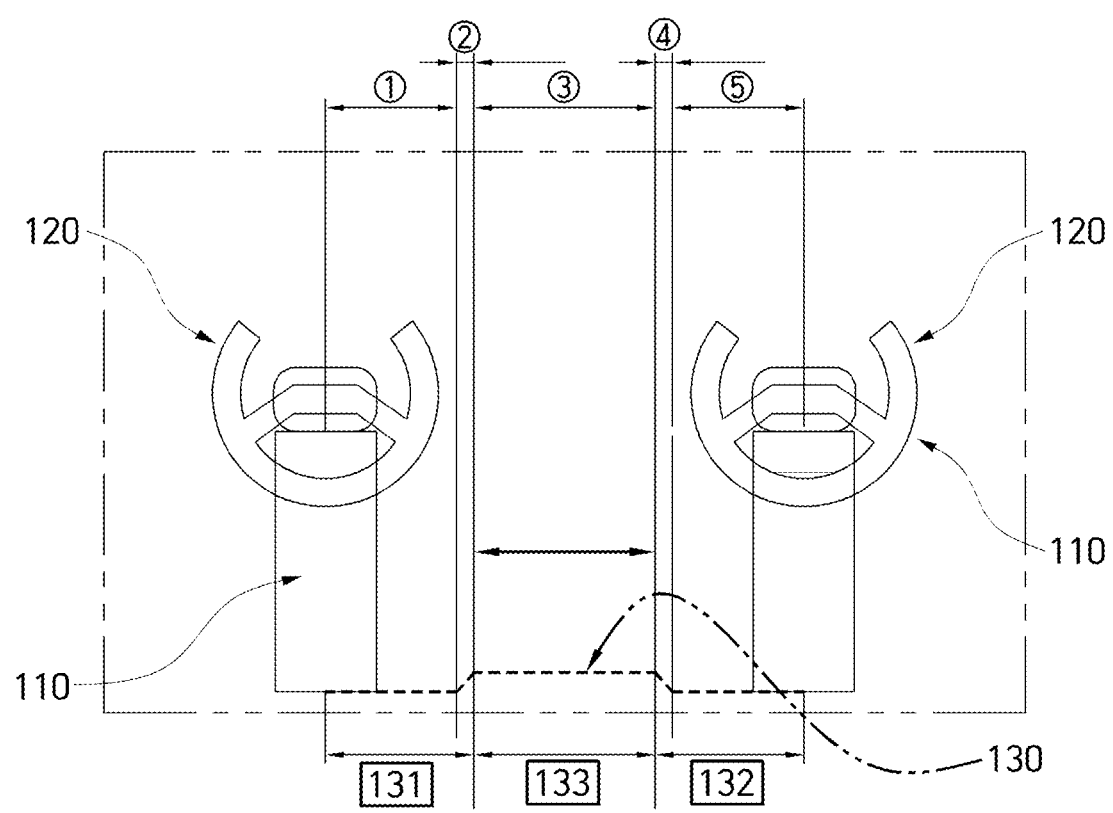

FIG. 1 is a perspective view schematically illustrating a vehicle in which a steering apparatus according to an embodiment of the present invention is installed, and FIGS. 2 to 4 are views illustrating exemplary operations of the steering apparatus according to the embodiment of the present invention on the basis of a cross-sectional structure taken along line A-A' illustrated in FIG. 1.

Referring to FIGS. 1 to 4, a steering apparatus 100 may be moved up and down in a vehicle 10 according to a body shape of an occupant.

The steering apparatus 100 includes a console unit 110, a handle unit 120, and a rail unit 130.

The console unit 110 may be switched left and right in front of a driver's seat and a front passenger seat in the vehicle 10. The console unit 110 may be positioned in front of the driver's seat and front passenger seat, and may be configured to be laterally movable between two lateral positions in the vehicle.

A lower end part of the console unit 110 may be moved left and right in a longitudinal direction of the rail unit 130. Further, an upper end part of the console unit 110 has a structure in which a position of the handle unit 120 is adjustable up and down.

In this case, the console unit 110 is inclined toward an engine room (not illustrated) at a predetermined angle.

The handle unit 120 may be built in the console unit 110. The handle unit 120 is built in the console unit 110 so as to be inserted into and withdrawn from the console unit 110 and has a function for steering the vehicle 10 when being withdrawn.

In this case, when the console unit 110 is popped up on the rail unit 130 by a user's manipulation and is withdrawn, locking of the handle unit 120 may be adjusted in a specific section of the console unit 110.

When the handle unit 120 rises from an upper end of the console unit 110, an effect on increasing a sitting space of the occupant or extending a free space of an arm reach may be obtained through tilt-up and tele-in motions in which the handle unit 120 is moved forward (in a direction of the engine room) and is rotated upward.

When the handle unit 120 descends from the upper end of the console unit 110, an effect on reducing the sitting space of the occupant or shortening the free space of the arm reach may be obtained through tilt-down and tele-out motions in which the handle unit 120 is moved rearward (in a direction of the occupant) and is rotated downward.

As illustrated in FIGS. 2 to 4, although it is illustrated that when the handle unit 120 is moved forward, the position of the handle unit 120 is raised and, when the handle unit 120 is moved rearward, the position of the handle unit 120 is lowered, this is only an example for describing the present invention, and the present invention is not limited to such a structural mechanism. Further, the position of the handle unit 120 may be adjusted in a state in which the handle unit 120 is unlocked from the console unit 110.

Meanwhile, the handle unit 120 includes a base plate 121, a steering column 122, a steering wheel 123, and a lever 124.

The base plate 121 may be moved up and down along the upper end part of the console unit 110.

The steering column 122 has a shape that is bent upward toward a rear of the base plate 121.

The steering wheel 123 is connected to a rear of the steering column 122.

The lever 124 may protrude from a portion of a lower end of the base plate 121 and may adjust vertical movement of the base plate 121. The lever 124 may be manually manipulated by the user or may be automatically manipulated by a separate control unit (not illustrated).

When the base plate 121 is withdrawn from the console unit 110, the lever 124 may be connected to a separate stopper (not illustrated) to function to adjust locking of the base plate 121. The rail unit 130 is disposed on a bottom surface of the console unit 110 to provide a path through which a position of the console unit 110 is switched left and right. In this case, the rail unit 130 may function to adjust the rotation only when the console unit 110 passes a specific section and is mounted on the driver's seat or the front passenger seat.

FIGS. 5 to 8 are views illustrating exemplary operations of left and right switching of a handle unit in a steering apparatus according to an embodiment of the present invention.

Referring to FIGS. 5 to 8, a steering apparatus 100 includes a console unit 110, a handle unit 120, and a rail unit 130. Among the corresponding components, the same contents as those described above are omitted, but may be repeatedly described in an emphasizing meaning as necessary.

The console unit 110 is positioned in front of a driver's seat and a front passenger seat in a vehicle.

The handle unit 120 is connected to the console unit 110 to steer the vehicle. When the position of the console unit 110 is switched on the rail unit 130 by the user's manipulation, rotation control by the handle unit 120 may be restricted in a specific section of the rail unit 130.

The rail unit 130 is disposed on a bottom surface of the console unit 110 to provide a path through which a position of the console unit 110 is switched left and right. The console unit may be movably mounted on the rail unit 130.

The rail unit 130 may be divided into a first flat section 131 (①) and a second flat section 132 (⑤), which are positioned in front of the driver's seat and the front passenger seat, respectively, and an engaging or engagement section 133 (②, ③, and ④), which connects the first and second flat sections 131 and 132 and is curved upward.

First and second inclined sections (② and ④) at both ends of the engaging section 133 are engaged with the handle unit 120 to restrict the rotation control by the handle unit 120.

The handle unit 120 is integrally connected to the console unit 110, and thus it is possible to switch the position of the handle unit 120 together with the console unit 110 in directions of the driver's seat and the front passenger seat along a longitudinal direction of the rail unit 130.

When the console unit 110 passes the engaging section 133 (②, ③, and ④) according to the position switching by the user's manipulation, the rotation control by the handle unit 120 interlocked with the console unit 110 should be restricted. This is to improve driving safety.

The handle unit 120 may be fixed by a locking unit (not illustrated) under a preset condition. Here, the preset condition refers to optimal reference data in consideration of a stop or parking state of a smart mobility vehicle (including a purpose built vehicle (PBV) or the like), whether a driving road is in a straight section, and driving safety. In addition, in the driving road determination logic, by monitoring a road condition in front with radio detection and ranging (RADAR), light detection and ranging (LiDAR), or the like, when the corresponding road is a straight section, it is determined that the console unit 110 interlocked with the handle unit 120 may be switched left and right. In this case, the locking unit may automatically and/or manually unlock the handle unit 120.

The rail unit 130 includes a position sensor (not illustrated) every predetermined section in the longitudinal direction thereof. When the console unit 110 enters the engaging section 133, the position sensor may transmit information on the corresponding position to a control unit (not illustrated) connected to the handle unit 120 to allow the control unit to restrict the rotation control by the handle unit 120 in the engaging section 133.

Figure 9:
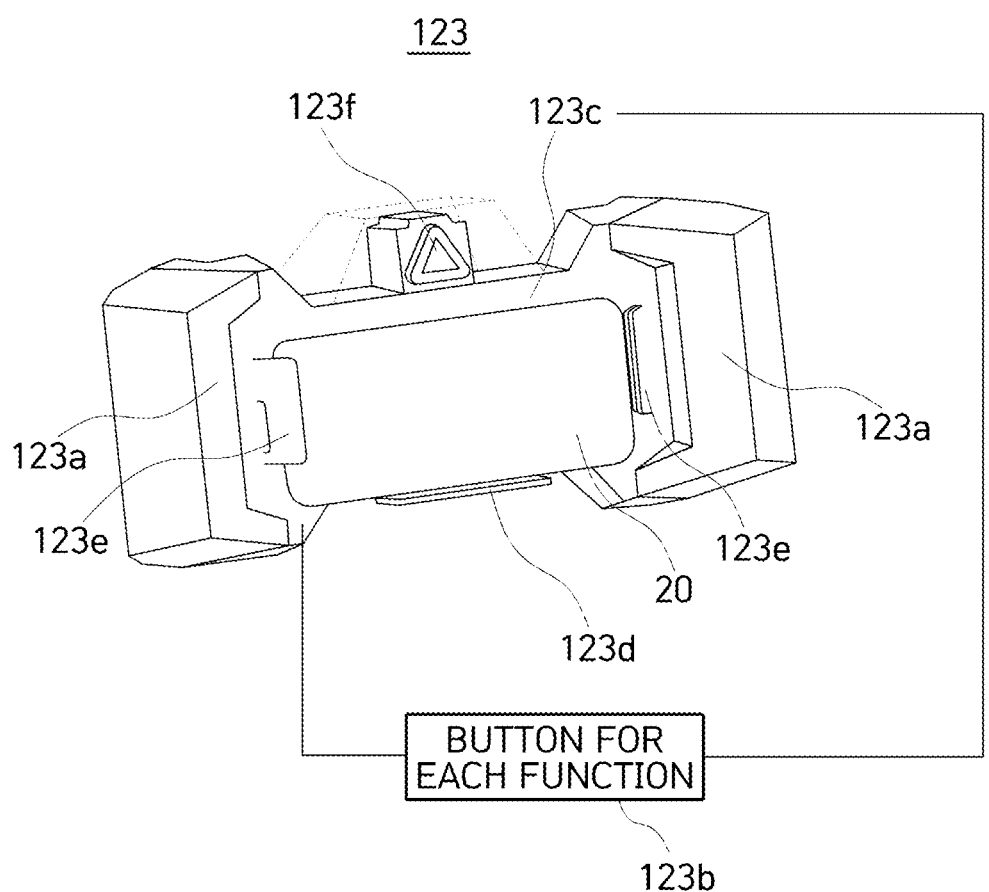
FIGS. 9 and 10 are views schematically illustrating a steering wheel in a steering apparatus according to an embodiment of the present invention.
Figure 10:
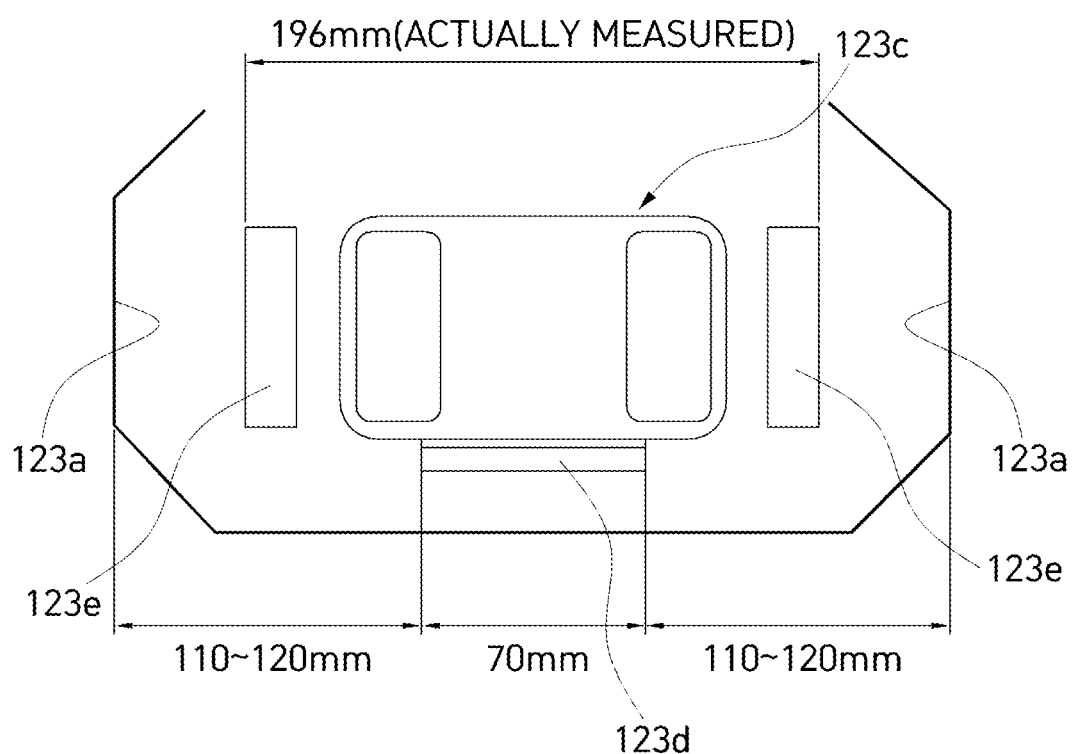

FIGS. 9 and 10 are views schematically illustrating a steering wheel in a steering apparatus according to an embodiment of the present invention.

Referring to FIGS. 9 and 10, a steering wheel 123 includes grip parts 123a, a button 123b for each function, a central part 123c, a support part 123d, fixing parts 123e, and a hazard switch 123f.

The steering wheel 123 may include the button 123b for each function of a paddle shift type to control locking of the steering wheel 123.

The central part 123c is connected to a rear of the steering column 122 (see FIGS. 2 to 4) so as to steer the steering column 122 and provides a mounting section for a mobile terminal 20. When the mobile terminal 20 is mounted on the mounting section of the central part 123c, the central part 123c may be paired with the vehicle through a vehicle control related application installed in the mobile terminal 20. Accordingly, a user (including an occupant) may select a desired option by touching the corresponding mobile terminal 20 while gripping the steering wheel 123. Here, the grip parts 123a are formed at both ends of the central part 123c to provide user's finger grip sections.

In this case, the central part 123c is connected to a smart mobility vehicle electrically (in a wired/wireless manner) so that, when the mobile terminal 20 is mounted on the central part 123c, the central part 123c may be automatically paired with the mobile terminal 20 according to preset terminal information.

The support part 123d is disposed at a lower end of the central part 123c to support the mobile terminal 20.

The fixing parts 123e are disposed between both ends of the central part 123c and the grip parts 123a to fix the mobile terminal 20. In this case, the fixing part 123e may be formed in a hinge-connected clamp type or may include a separate buffer member (not illustrated) disposed in a section in contact with the mobile terminal 20, to fix the mobile terminal 20.

In the case of dimensions of the steering wheel 123 illustrated in FIG. 10, a left and right length of the steering wheel 123 is about 196 mm, a distance between one end of the support part 123d and a left grip part 123a ranges from about 110 to 120 mm, and a distance between another end of the support part 123d and a right grip part 123a ranges from about 110 to 120 mm.

Here, a left and right length of the support part 123d may be about 70 mm. Information on the dimensions between the components of the steering wheel 123 illustrated in FIG. 10 is only one example and the present invention is not limited to these dimensions. However, dimension ratios between the corresponding components may be significant.

Figure 11:
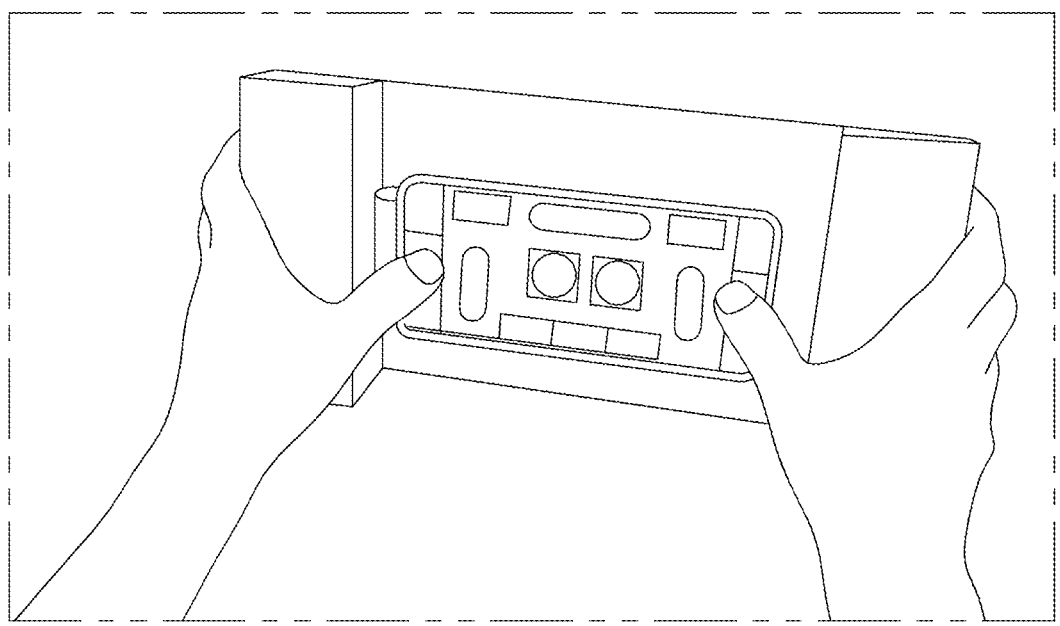
FIGS. 11 and 12 are views schematically illustrating a prototype of a steering wheel in a steering apparatus according to an embodiment of the present invention.
Figure 12:
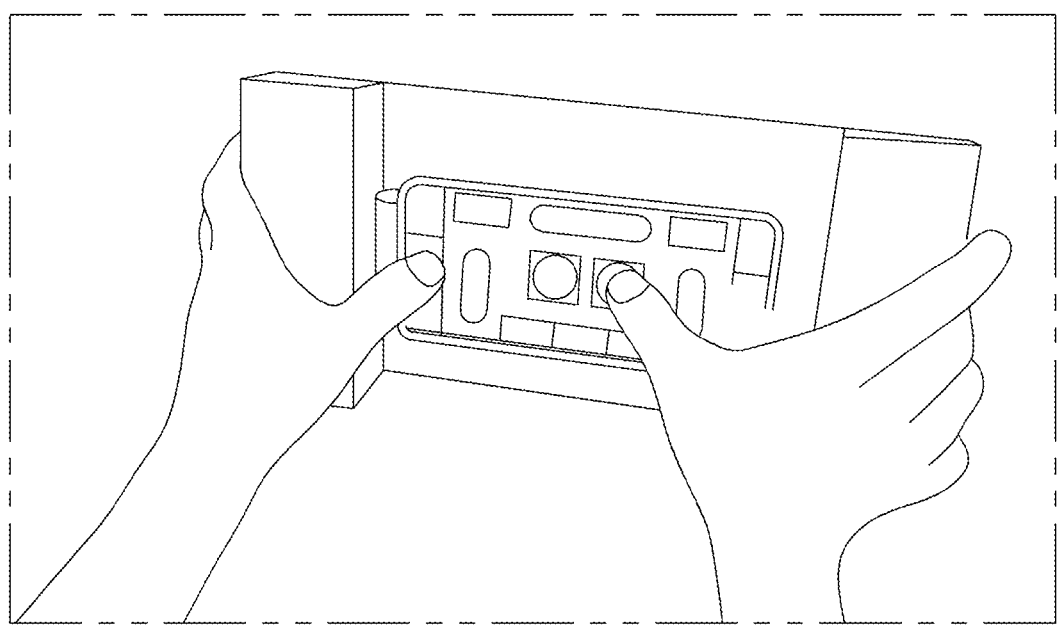

FIGS. 11 and 12 are views schematically illustrating a prototype of a steering wheel in a steering apparatus according to an embodiment of the present invention.

A steering wheel 123 in FIGS. 11 and 12 is manufactured as a prototype, and conditions for gripping the steering wheel 123 during driving, conditions for manipulating a screen of a mobile terminal, and the like are considered.

What should be considered in the corresponding conditions is that a user should be able to easily touch or manipulate the screen of the mobile terminal using his or her thumb while holding the steering wheel 123.

Further, the grip parts 123a (see FIGS. 9 and 10) of the steering wheel 123 should allow the user to easily grip the mobile terminal mounted on the central part 123c (see FIGS. 9 and 10). Each piece of dimension information according to the corresponding condition is in the form of that illustrated in FIG. 10, and the corresponding dimension needs not be limited to the present invention, as described above and, however, dimension ratios between the components may be significant.

In order for the mobile terminal to be easily manipulated by the user in a state in which the mobile terminal is mounted on the steering wheel 123, arrangement of buttons for each function on an application in the mobile terminal may be changed according to the user's setting.

According to the present invention, a steering apparatus can provide a convenient structure so that occupants having different body shapes can comfortably drive.

For example, according to the present invention, by selectively adjusting a position of a steering wheel according to the physique/position of an occupant, it is possible to significantly improve the driving convenience of the occupant.

Further, according to the present invention, the existing cockpit structure is removed, and thus the steer apparatus can be slid left and right through a rail structure mounted on the bottom of the steer apparatus. Furthermore, there is no separate component in front of the driver's seat and the front passenger seat in the vehicle, and thus there is a structural advantage in that a space can be used widely for various purposes.

In particular, according to the present invention, a handle unit is built in a console unit, and thus there is a structural feature in that the handle unit can be selectively used as necessary. Further, according to the present invention, the existing cockpit structure is removed, and thus the steer apparatus can be slid left and right through a rail structure mounted on the bottom of the steer apparatus. Furthermore, there is no separate component in front of the driver's seat and the front passenger seat in the vehicle, and thus there is a structural advantage in that a space can be used widely for various purposes.

In addition, when it is not necessary to manipulate the handle unit, the console unit can be positioned in various positions other than in front of the driver's seat and the front passenger seat in the vehicle so that an interior of the vehicle can be used as a large space.

The present invention is not limited to the above-described embodiments and various modifications can be made within the scope of the technical spirit of the present invention.

What is claimed is:

1. A steering apparatus comprising:
   a console unit positioned in front of a driver's seat and a front passenger seat in a vehicle, and configured to be laterally movable between first and second lateral positions in the vehicle;
   a handle unit connected to the console unit and configured to be manipulated by a driver for steering the vehicle; and
   a rail unit configured to provide a lateral movement path for the console unit and divided into a plurality of sections including a restriction section, the console unit being movably mounted on the rail unit,
   wherein the handle unit is configured such that a rotation of the handle unit is restricted when the console unit is moved to and positioned at the restriction section of the rail unit.

2. The steering apparatus of claim 1, wherein the console unit comprises:
   a lower portion configured to laterally move in a longitudinal direction of the rail unit; and
   an upper portion configured to allow the driver to vertically adjust a position of the handle unit.

3. The steering apparatus of claim 1, wherein the handle unit includes:
   a base plate configured to be vertically movable along an upper part of the console unit;
   a steering column bent toward a rear of the base plate;
   a steering wheel connected to a rear of the steering column; and
   a lever protruding from a lower portion of the base plate and configured to allow the driver to vertically adjust a position of the base plate.

4. The steering apparatus of claim 3, wherein the steering wheel includes a button for activating a paddle shift function.

5. The steering apparatus of claim 3, wherein the steering wheel includes:
   a central part connected to the rear of the steering column and having a mounting section for holding a mobile terminal; and
   a pair of grip parts connected to both sides of the central part and configured to be grabbed by the driver's fingers.

6. The steering apparatus of claim 1, wherein the handle unit includes a mounting section configured to hold a mobile terminal.

7. The steering apparatus of claim 1, wherein:
   the plurality of sections of the rail unit further includes:
      first and second sections laterally space part from each other and positioned in front of the driver's seat and the front passenger seat, respectively; and
      an engagement section positioned between the first and second sections and curved upwardly, and
   the restriction section of the rail unit includes the first and second sections and the engagement section.

8. The steering apparatus of claim 7, further comprising a control unit connected to the handle unit and configured to restrict a rotation of the handle unit when the console unit is moved to and positioned at the engagement section of the rail unit,
   wherein the rail unit includes a position sensor positioned at each section, and
   wherein, when the console unit is moved to and positioned at the engagement section, the position sensor of the engagement section is configured to transmit, to the control unit, information that the console unit is positioned at the engagement section.

9. A steering apparatus of a purpose-built vehicle (PBV) comprising:
   a storage region positioned in front of a driver's seat and a front passenger seat of the PBV;
   a console unit configured to be laterally movable in the storage region;
   a handle unit connected to the console unit and configured to be manipulated by a driver for steering the PBV; and
   a rail unit configured to provide a lateral movement path for the console unit and divided into a plurality of sections including a first section,
   wherein the console unit is movably mounted on the rail unit, and
   wherein a rotation of the handle unit is restricted when the console unit is moved to and positioned at the first section of the rail unit.

10. The steering apparatus of claim 9, wherein:
    the plurality of sections of the rail unit further includes second and third sections respectively corresponding to the driver's seat and the front passenger seat,
    the first section is positioned between the second and third sections, and
    the rotation of the handle unit is allowed when the console unit is moved to and positioned at the second or third section.

11. A pop-up steering apparatus comprising:
    a console unit positioned in front of a driver's seat and a front passenger seat in a vehicle, and configured to be laterally movable between first and second lateral positions in the vehicle;
    a handle unit configured to be inserted into and ejected from the console unit; and
    a rail unit configured to provide a lateral movement path for the console unit,
    wherein the console unit is movably mounted on the rail unit, and
    wherein the handle unit is configured to be manipulated by a driver for steering the vehicle when the handle unit is ejected from the console unit.

12. The pop-up steering apparatus of claim 11, wherein, when the console unit is popped up on the rail unit by the driver's manipulation and is withdrawn, locking of the handle unit is adjusted in a specific section of the console unit.

13. The pop-up steering apparatus of claim 11, wherein:
the rail unit is divided into a plurality of sections including a first section, and
the handle unit is configured such that a rotation of the handle unit is restricted when the console unit is moved to and positioned at the first section of the rail unit.

14. The pop-up steering apparatus of claim 11, wherein the handle unit includes:
a base plate configured to be vertically movable from within the console unit to an outside of the console unit;
a steering column bent toward a rear of the base plate;
a steering wheel connected to a rear of the steering column; and
a lever protruding from a lower portion of the base plate, and configured to be manipulated by the driver to vertically move the base plate.

15. Pop-up steering apparatus of claim 14, wherein, when the base plate is ejected from the console unit, the lever is connected to a separate stopper to adjust locking of the base plate.

16. The pop-up steering apparatus of claim 14, wherein the steering wheel includes a button for activating a paddle shift function.

17. The pop-up steering apparatus of claim 14, wherein the steering wheel includes:
a central part connected to the rear of the steering column and having a mounting section for mounting a mobile terminal; and
a pair of grip parts positioned at both sides of the central part and configured to be grabbed by the driver's fingers.

18. The pop-up steering apparatus of claim 11, wherein the handle unit includes a mounting section configured to hold a mobile terminal.

19. The pop-up steering apparatus of claim 11, wherein the console unit includes:
a lower portion configured to be laterally movable along the lateral movement path; and
an upper portion configured to allow the driver to adjust a vertical position of the handle unit.

20. A vehicle having a driver's seat and a front passenger seat disposed on a floor of the vehicle, the vehicle comprising:
a rail unit disposed at the floor and extending in a lateral direction of the vehicle;
a console unit mounted on the rail unit and configured to be laterally movable on the floor along a lateral movement path provided by the rail unit, the console unit positioned in front of the driver's seat and the front passenger seat; and
a handle unit coupled to the console unit and configured to be manipulated by a driver for steering the vehicle.

* * * * *